(12) United States Patent
Miyajima

(10) Patent No.: US 7,222,637 B2
(45) Date of Patent: May 29, 2007

(54) CONNECTOR EQUIPPED WITH A VALVE

(75) Inventor: Atsuo Miyajima, Inuyama (JP)

(73) Assignee: Honda Motor Co., Ltd. (JP)

( * ) Notice: Subject to any disclaimer, the term of this patent is extended or adjusted under 35 U.S.C. 154(b) by 129 days.

(21) Appl. No.: 10/666,485

(22) Filed: Sep. 19, 2003

(65) Prior Publication Data
US 2004/0060599 A1    Apr. 1, 2004

(30) Foreign Application Priority Data
Sep. 27, 2002    (JP)    ............... 2002-284059

(51) Int. Cl.
 F16K 15/02    (2006.01)
 F16L 29/00    (2006.01)
(52) U.S. Cl. ............... 137/515.5; 137/515; 137/513.3; 137/543.23; 251/333
(58) Field of Classification Search ............... 137/515, 137/515.5, 543.23, 513.3; 251/333
See application file for complete search history.

(56) References Cited

U.S. PATENT DOCUMENTS

| | | | | |
|---|---|---|---|---|
| 3,565,100 A | * | 2/1971 | Pfleger | ............... 137/269.5 |
| 3,601,361 A | * | 8/1971 | Hundhausen et al. | .... 251/149.1 |
| 4,474,189 A | * | 10/1984 | Brown | ............... 137/210 |
| 5,113,900 A | * | 5/1992 | Gilbert | ............... 137/515.5 |
| 5,277,402 A | | 1/1994 | Szabo | |
| 6,347,815 B1 | * | 2/2002 | Kargula et al. | ............... 285/345 |
| 6,397,884 B1 | | 6/2002 | Miyajima et al. | |

FOREIGN PATENT DOCUMENTS

| | | |
|---|---|---|
| JP | 08-216707 | 8/1996 |
| JP | 11002348 A * | 1/1999 |
| JP | 2003-28010 A1 | 1/2003 |

OTHER PUBLICATIONS

Patent Abstracts of Japan for JP2003-028010 published on Jan. 29, 2003.
Patent Abstracts of Japan for JP08-216707 published on Aug. 27, 1996.

* cited by examiner

Primary Examiner—Ramesh Krishnamurthy
(74) Attorney, Agent, or Firm—Anderson Kill & Olick, PC

(57) ABSTRACT

A connector housing of a valve-equipped connector is integrally formed from a tube connection section at a first axial side; a pipe insertion section at a second axial side; and a valve housing section between the tube connection section and the pipe insertion section. The valve housing section is formed with an adequately large inner diameter. A main valve body and a compression coil spring for biasing the main valve body to the first axial side so that it abuts the inner surface of the housing are stored in the valve housing section. A cylindrical bushing is fitted to the first axial side of the pipe insertion section of the connector housing, and a valve cap for receiving a second axial end of the compression coil spring is formed integrally at the first axial end of the cylindrical bushing.

5 Claims, 8 Drawing Sheets

CONNECTOR EQUIPPED WITH A VALVE

BACKGROUND OF THE INVENTION

1. Field of the Invention

The present invention relates to a connector equipped with a valve such as those used for evaporation tubes in fuel supply systems of automobiles.

2. Discussion of the Related Art

In order to prevent fuel vapor gas generated in gasoline fuel tanks of automobiles from being discharged into the atmosphere, a vapor discharge prevention mechanism that causes the vapor to be adsorbed in the canister is widely used. In this type of vapor discharge prevention mechanism, the evaporation tube connecting the fuel tank and the canister uses a one-way or check valve to maintain an appropriate pressure in the fuel tank.

In this type of evaporation tube, rubber hoses are connected to the ends of the one-way valve or check valve. The end of the rubber hose on a first side is connected, e.g., to a connecting pipe connected to a roll-over valve disposed on the fuel tank. A second end of the rubber hose on a second side is connected to a connecting pipe on the canister side. Transpiration of gasoline from the fuel supply pipe must be kept at a minimum so resin tubes are sometimes used in place of rubber hoses. When resin tubes are used, the connections between the resin tubes and the connecting pipes are often made with connectors or quick connectors. Also, with the demand in recent years for low gasoline transpiration, minute gasoline transpiration from the connection sections such as the rubber hoses or the resin tubes, the one-way valves, and the like must now be controlled. Thus, the number connection points between structural elements must be reduced to lower gasoline transpiration.

One prior art proposal for reducing connection points between structural elements as well as reducing the number of parts in the evaporation tubing, a one-way valve or a check valve is either mounted internally in or added to a quick connector equipped with an insertion section for connecting pipes.

U.S. Pat. No. 6,397,884 (U.S. '884) in FIG. 1 and column 8; lines 8-40 discloses a quick connector having a one-way valve or check valve internally or as an add-on. U.S. '884's connector housing has a tube connection section formed on a first axial end and a pipe insertion section formed on a second axial end. A valve cap is formed integrally from a small-diameter section and a large-diameter section is attached to cover a first axial end of the tube connection section. A main valve body is housed in this valve cap so that it can move in the axial direction, and this main valve body is biased toward the first axial side by a compression spring. The main valve body closes the fluid flow path by abutting a ring-shaped valve seat surface formed on the inner surface of the valve cap between the small-diameter section and the large-diameter section. The fluid flow path is opened when main valve body receives fluid pressure from the first axial side and moves away from the valve seat surface. See, U.S. '884, FIG. 1 and column 8, lines 8-40.

In this type of connector equipped with a valve, if the evaporation tube that is attached is a large-diameter tube, the tube connected to the tube connection section has a large diameter, and the tube connection section has a large diameter, a valve cap having a large inner diameter can be used, thus allowing the valve seat surface and the closing section of the main valve body to be formed with large diameters. This allows the necessary flow to be provided when the flow path is opened. However, if the evaporation tubing is a small-diameter tube, the tube connected to the tube connection section has a small diameter, and the tube connection section is formed with a small diameter, a valve cap with a small inner diameter must be used, and the valve seat surface (the inner perimeter side of the valve seat surface) formed between the small-diameter section and the large-diameter section will often have a smaller diameter than the through-path of the tube connection section. This restriction makes it difficult to provide the necessary flow when the flow path is open. Furthermore, with this type of connector equipped with a valve, the valve cap is connected and secured, e.g., by being pushed into or adhesed, to the tube connection section after the elements of the valve have been assembled in the valve cap. Thus, the production of the connector equipped with a valve becomes complicated.

In an example of a connector equipped with a valve that can provide adequate flow even when used with small diameter evaporation tubing and that is also easy to produce, a valve housing section is disposed between the tube connection section and the pipe insertion section. The valve housing section has an inner diameter adequately larger than that of the tube connection section and can house a large-diameter main valve body. A connector housing is formed with an inner diameter equal to the valve housing section or with an inner diameter that is slightly larger than the valve housing section. On a first axial side of the pipe insertion section, the connector housing is used to house the main valve body along with a compression spring in the valve housing section. In this type of connector, there is no direct support to provide a secure fit at the first axial side of the pipe insertion section when a small-diameter connection pipe is inserted into the pipe insertion section, so a cylindrical bushing is fitted to the first axial side of the pipe insertion section to fill the gap formed with the connection pipe. The valve seat surface that abuts the main valve body is formed on a first axial end of this bushing. In this connector equipped with a valve, the bushing with the valve seat surface, the main valve body, and the compression spring, which are elements of the valve, can all be placed in the connector housing from a second axial end opening of the pipe insertion section. Thus, housing connection operations such as pressing elements in, adhesing, or welding are not required, and the main valve body and the valve seat surface can be formed with large diameters and a high flow volume can be provided when the valve is open.

However, in this type of connector equipped with a valve, the valve seat surface is formed on the bushing fitted to the connector housing. Since the accuracy of valve functions is dependent on precise dimensions in the main valve body, the connector housing, and the bushing, as well as precision in the assembly of the bushing, care must be taken when producing parts and assembling the bushing. This makes the connector less efficient to produce.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

OBJECT AND SUMMARY OF THE INVENTION

Figure 1:
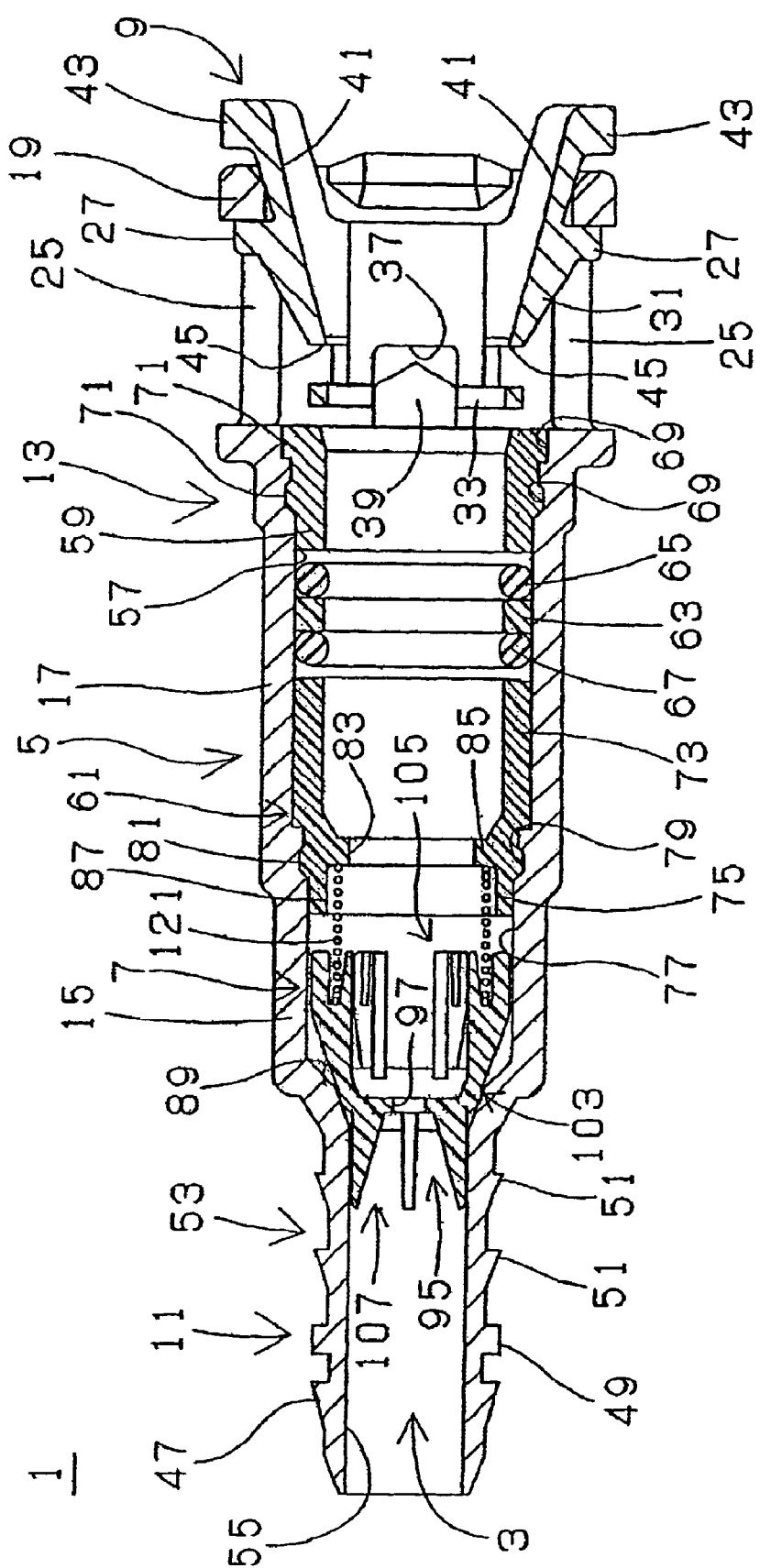
FIG. 1 is a cross-sectional view of a connector equipped with a valve according to the present invention.

The object of the present invention is to provide a connector equipped with a valve that can provide a large flow when the valve is open and also can be efficiently produced.

The present invention provides a connector equipped with a valve including a connector housing with a through path, a tube connection section being formed at a first axial side and a pipe insertion section being formed at a second axial side; and an internal valve disposed in the connector housing to open and close the through path. The connector housing includes a valve housing section disposed between the tube connection section and the pipe insertion section, an inner diameter of the valve housing section is larger than an inner diameter of the tube connection section. The internal valve includes a valve seat surface formed at an inner surface of the housing between the tube connection section and the valve housing section; a closing section with an outer perimeter section on which is formed an abutting surface abutting the valve seat surface; a main valve body housed in the valve housing section to allow axial movement. A compression spring biases the main valve body toward a first axial side. A cylindrical bushing is fitted to the pipe insertion section to fill space between an inner perimeter surface of a first axial side of the pipe insertion section and an insertion-side end of an inserted pipe body. Since the valve seat surface is formed on the inner housing surface, the accuracy of valve functions is essentially dependent only on the precision of the dimensions of connector housing and the main valve body. Thus, a connector equipped with a valve can be produced efficiently.

As a result, a valve seat surface having a diameter larger than that of the through-path of the tube connection section can be formed, and a large-diameter abutting surface that abuts the valve seat surface can use a large-diameter main valve body having a closing section formed on the outer perimeter section. As a result, when the valve is open a large flow can be provided.

The first axial side of the valve insertion section is generally formed with an inner diameter that is the same or somewhat larger than the valve housing section, but a secure fit of the pipe body is provided by using the cylindrical bushing to fill the space between the inner surface of the first axial side of the pipe insertion section and the connecting pipe or the insertion-side end of the pipe body. Also, by forming a valve cap on the first axial end of the cylindrical bushing to receive the axial second end of the compression spring, a large-diameter valve cap can be used. Thus, even if a large through-hole that does not narrow the flow path is formed in the valve cap, the outer perimeter section of the through-hole can stably receive the axial second end of the compression spring. Also, the precision of the dimensions of the valve cap and the main valve body can be designed separately. Also, the tube can be fitted so that it extends beyond the tube connection section and reaches the valve housing section.

Tilting of the main valve body during opening and closing operations can cause an obstruction. The main valve body can be formed with, for example, a housing-side guide extending from the closing section to the second axial side and a connection-side guide extending toward the first axial side to prevent tilting. The housing-side guide slides over the inner perimeter surface of the valve housing section and the connection-side guide slides over the inner perimeter surface of the tube connection section.

The first axial end of the compression spring can be held and supported in a support groove formed at a second axial side or end of the housing-side guide. This allows the compression spring to be formed with a large diameter and prevents the narrowing of the flow path when the spring receiving section is formed to receive the second axial end of the compression spring.

A small through-hole can be formed on the closing section of the main valve body to communicate with the through-path at both axial ends of the closing section. A small flow can be sent through the small through hole to the second axial side even if the fluid pressure at the first axial side is not high enough to move the main valve body.

The valve seat surface can be formed with a linear cross-section shape, and the abutting surface of the closing section can be formed with an arc projecting outward as seen from the cross-section. Thus, can contact between the valve seat surface and the abutting surface of the closing section take place along a line to provide a reliable flow blocking function when the valve is closed.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The embodiments of the present invention will be described using FIG. 1 through FIG. 7.

Figure 2:
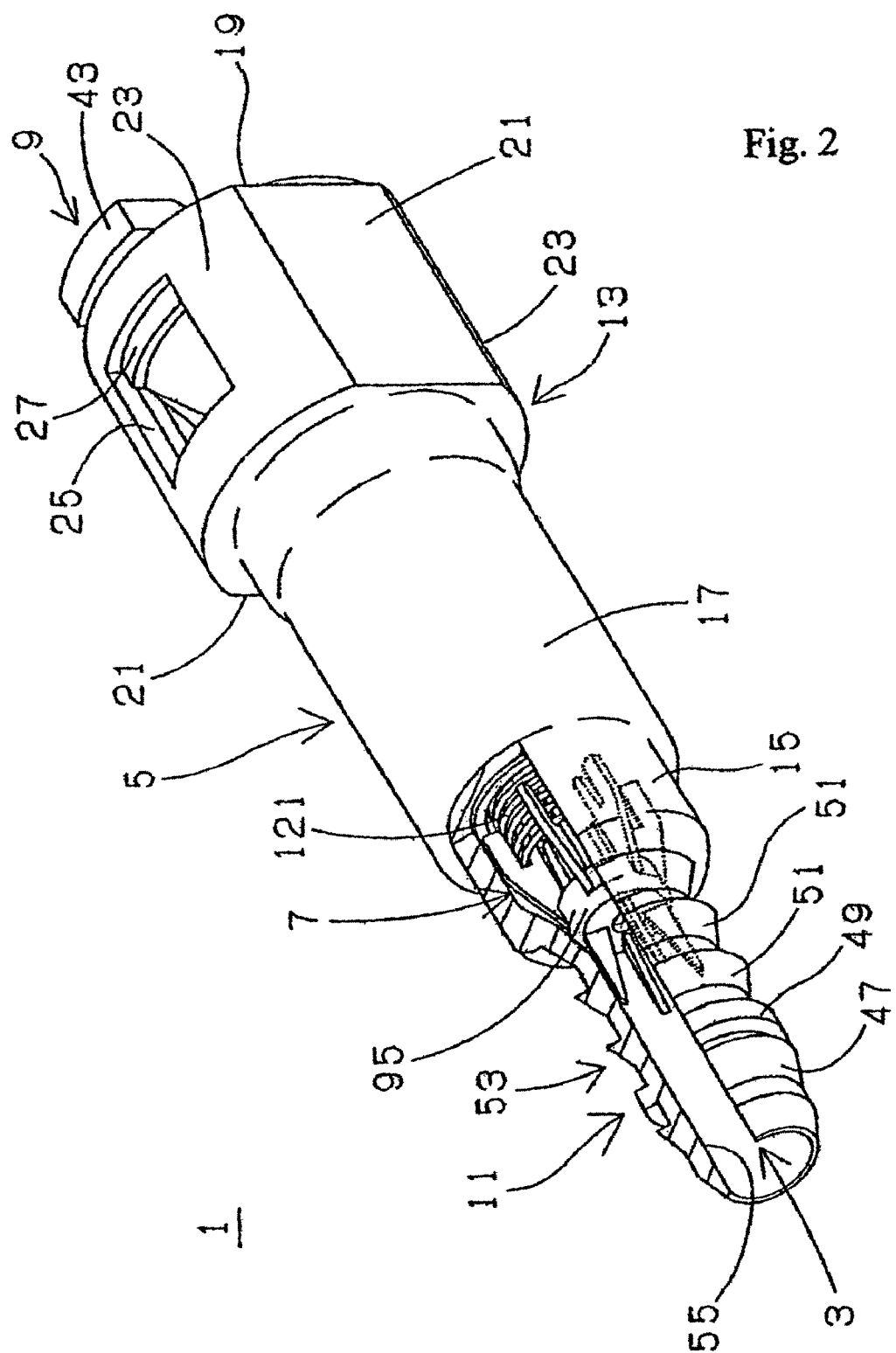
FIG. 2 is a partially cut-away perspective view of a connector equipped with a valve of the present invention.

FIG. 1 is a cross-sectional view of a connector with internal valve according to the present invention. FIG. 2 is a partially cut-away perspective view of a connector with internal valve.

A connector with internal valve 1 used, for example, with evaporation tubing for gasoline fuel tank, includes a connector housing 5 formed with a through-path 3 in the axial direction and can be made from a glass fiber reinforced polyamide (PA/GF-, e.g., a glass fiber reinforced nylon 6). An internal check valve 7 is fitted inside the connector housing 5; and a retainer 9 is fitted to the connector housing 5 and can also be made from PA, (e.g., nylon 6/12). The connector housing 5 can be integrally formed and includes: a tube connecting section 11 formed with a small diameter at a first axial end thereof; a pipe insertion section 13 at a second axial end; and a valve housing section 15 interposed between the tube connecting section 11 and the pipe insertion section 13. The pipe insertion section 13 can be integrally formed and includes a pipe support section 17 at a first axial end; and a retainer support section 19 at a second axial end which holds and supports the retainer 9.

Figure 3:
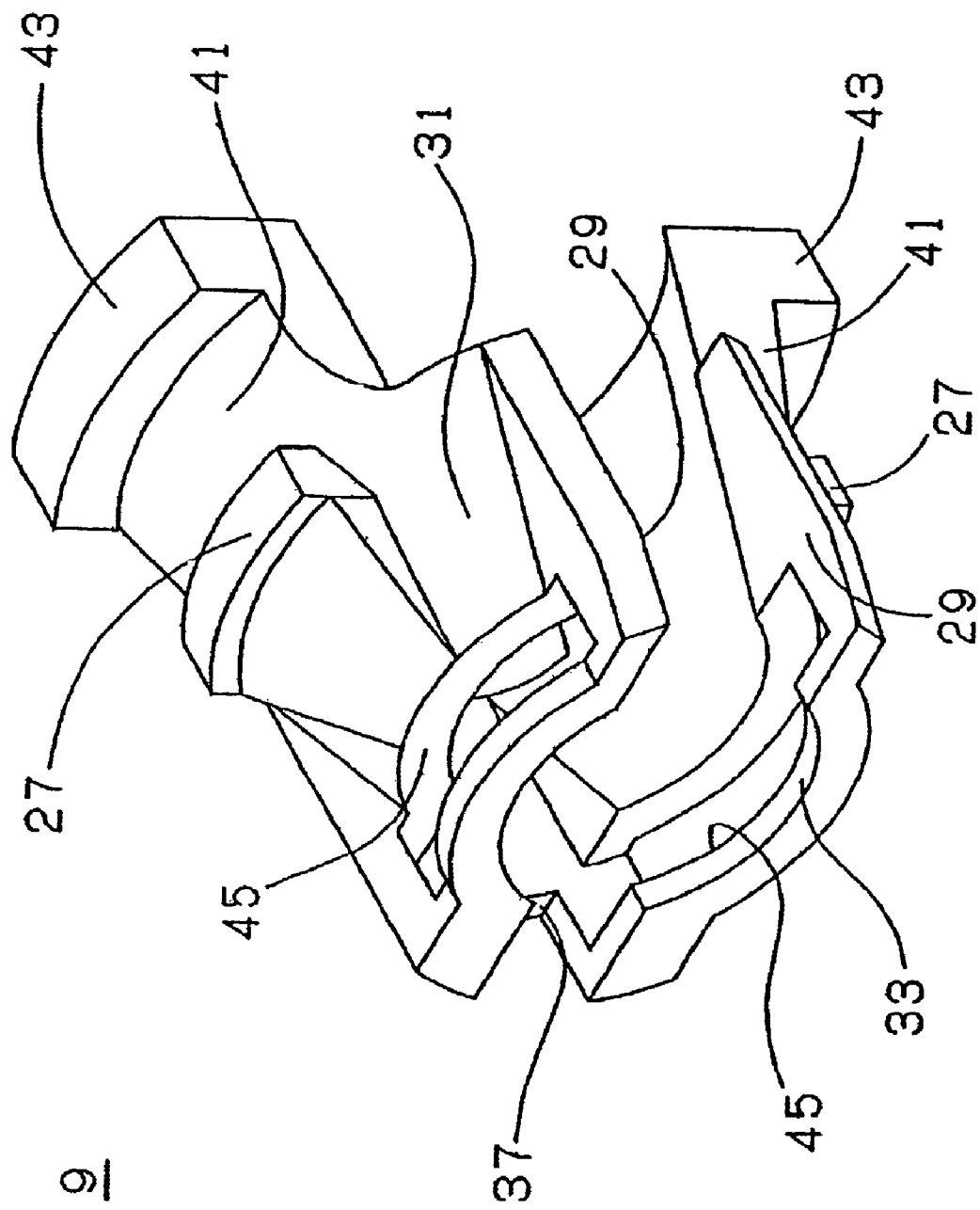
FIG. 3 is a perspective view of a retainer of the present invention.

On the retainer support section 19 of the connector housing 5, flat sections 21, 21 are formed on the perimeter wall at radially symmetrical positions. Engagement windows 25, 25 are formed facing each other on arcuate sections 23, 23 of the perimeter wall. The retainer 9 is held in the retainer support section 19 is relatively flexible and is formed so that it can be elastically deformed. As shown in FIG. 3, (FIG. 3 is a perspective drawing of the retainer 9), a pair of engagement claws 27, 27 project radially outward and are formed at radially symmetrical positions at the second axial end. The retainer 9 includes a main body 31 having a C-shaped cross-section with a relatively large gap between perimeter ends 29, 29 to allow deformation. The inner surface of the main body 31 is formed with a diameter that decreases toward the first axial end with the exception of the section that faces the deformation gap and the perimeter ends 29, 29. A first axial end 33 of the main body 31 is formed with an inner diameter almost identical to the outer diameter of a pipe body 35 (see FIG. 6) with the exception of the section facing the deformation gap and the perimeter ends 29, 29. The section of the main body 31 facing the deformation gap has an inner surface that is roughly the same as the inner surface of a cylinder. A cut-out cavity 37 is formed at the first axial end of the section of the main body 31 facing the deformation gap. This cut-out cavity 37 is fitted with a rotation-stopping projection 39 disposed at the first axial end of the inner perimeter surface of the retainer support section 19, thus preventing rotation of the retainer 9 in the retainer support section 19.

A pair of operating arms 41, 41, disposed integrally with the second axial end of the main body 31 of the retainer 9, extend radially outward in a sloping manner from positions aligned with the engagement claws 27, 27 toward the second axial end. Operating ends 43, 43 project radially outward and are formed at axial second ends of the operating arms 41, 41. The axial first end 33 of the main body 31 is formed with facing engagement slits 45, 45 extending along the perimeter direction. When the retainer 9 formed in this manner, the retainer 9 is pushed into and fitted against the retainer support section 19 so that the engagement claws 27, 27 are inserted in the engagement windows 25, 25 of the retainer support section 19, and the operating ends 43, 43 engage with the axial second end of the retainer support section 19.

The tube connecting section 11 of the connector housing 5 includes a first axial side 47 having a diameter that increases gradually toward the second axial end and having a cross-section in the shape of a right triangle; a second axial side 53 is disposed toward the second axial side from the first axial side 47 and has an outer perimeter surface formed roughly in the shape of a simple cylindrical outer surface. Formed on the outer perimeter surface are, going in order from the first axial side to the second axial side and separated by an axial interval, a slip-preventing ring-shaped projection 49 having a rectangular cross-section shape and two slip-preventing ring-shaped projections 51 having cross-sections in the shape of right triangles and having a diameter that increases toward the axial second end. An inner perimeter surface 55 of the tube connecting section 11 extends in the shape of the inner surface of a simple small-diameter cylinder and forms a through-path 3 at the first axial side. A tube will generally be fitted to the entire length of the tube connecting section.

An inner perimeter surface 57, of the pipe support section 17 of the connector housing 5, extends roughly in the shape of the inner surface of a large-diameter cylinder and forms a through-path 3 toward the second axial end. A ring-shaped bushing 59 is formed from PA/GF, (e.g., glass fiber reinforced nylon 12), and is fitted to the second axial end of the inner perimeter surface 57 of the pipe support section 17. A cylindrical bushing 61 is formed from a polyacetal (POM) or glass fiber reinforced nylon 12, and is fitted to the second axial end. A first O-ring 65 and a second O-ring 67 are fitted on either side of a collar 63 formed from POM or glass fiber reinforced nylon 12. A securing cavity 69 is formed on the second axial end of the inner perimeter surface 57 of the pipe support section 17. An engagement projection 71 is formed on the outer perimeter surface of the ring-shaped bushing 59, and is fitted to the securing cavity 69 so that the ring-shaped bushing 59 is attached to the pipe support section 17 in a manner that prevents axial movement. The cylindrical bushing 61 is formed from a main bushing body 73 having a shape that is roughly that of a simple cylinder and a valve cap 75 of an internal check valve 7 that is integrally connected to a first axial end of the main bushing body 73. The main bushing body 73 is fitted to the inner perimeter surface 57 of the pipe support section 17. However, the valve cap 75 is positioned so that it projects inside the valve housing section 15. The ring-shaped bushing 59 and the main bushing body 73 of the cylindrical bushing 61 have roughly the same inner diameters. The first O-ring 65 on the second axial side is formed from fluoro-silicone rubber (FVMQ), which has superior water- and dust-proof properties as well as resistance to low temperatures and ozone. The second O-ring 67 on the first axial side is formed from a fluoro rubber, which has superior water- and dust-proof properties as well as resistance to gasoline and ozone.

Figure 4:
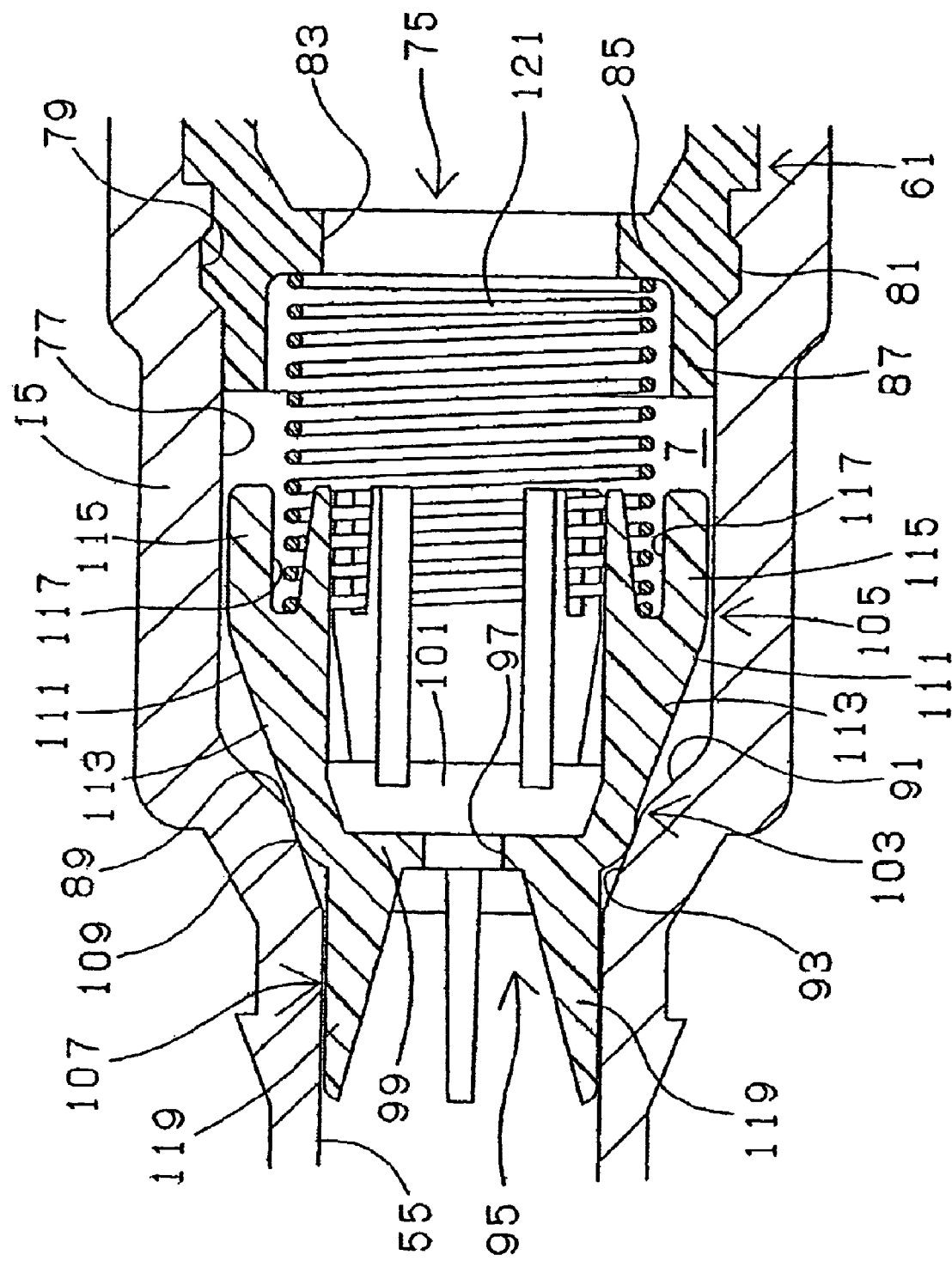
FIG. 4 is a cross-sectional view of an internal check valve of the present invention.

Referring to FIG. 4, an inner perimeter surface 77 of the valve housing section 15 of the connector housing 5 extends and forms roughly the same shape as the inner surface of a simple cylinder and forms the through-path 3 at an axial midpoint. The inner perimeter surface 77 is formed with a diameter slightly smaller than that of the inner perimeter surface 57 of the pipe support section 17 at the pipe insertion section 13 and is formed large enough for the diameter of the inner perimeter surface 55 of the tube connecting section 11. A securing cavity 79 is formed on a second axial end of the inner perimeter surface 77 of the valve housing section 15. The outer surface of a first axial end of the cylindrical bushing 61 is in contact with the inner surface of the first axial end of the pipe support section 17. An engagement projection 81 is formed on the outer perimeter surface of the valve cap 75 and is fitted to the securing cavity 79. The engagement projection 81 permits attachment to the pipe insertion section 13 or the pipe support section 17 (or the pipe support section 17 and the valve housing section 15) without axial movement. The valve cap 75 is integral with and opens up radially inward from the first axial end of the main bushing body 73. A ring-shaped spring receiving section 85 is formed on the inner perimeter of the valve cap 75 and has a hole 83 communicating with the inner perimeter and a cylindrical section 87 extending integrally from the outer perimeter of the spring receiving section 85 toward the first axial end.

Referring again to FIG. 4, a housing inner perimeter surface 89 disposed between the valve housing section 15 and the tube connecting section 11 includes a first ring-shaped surface 91 tapering at a sharp angle from the first axial end of the inner perimeter surface 77 of the valve housing section 15 and extending along the axis; and a second ring-shaped surface 93 tapering gently from the first axial end of the first ring-shaped surface 91 to the second axial end of the inner perimeter surface 55 of the tube connecting section 11. The first ring-shaped surface 91 and the second ring-shaped surface 93 have roughly the same lengths along the axis and the second ring-shaped surface 93 serves as a valve seat surface for the internal check valve 7.

Figure 5:
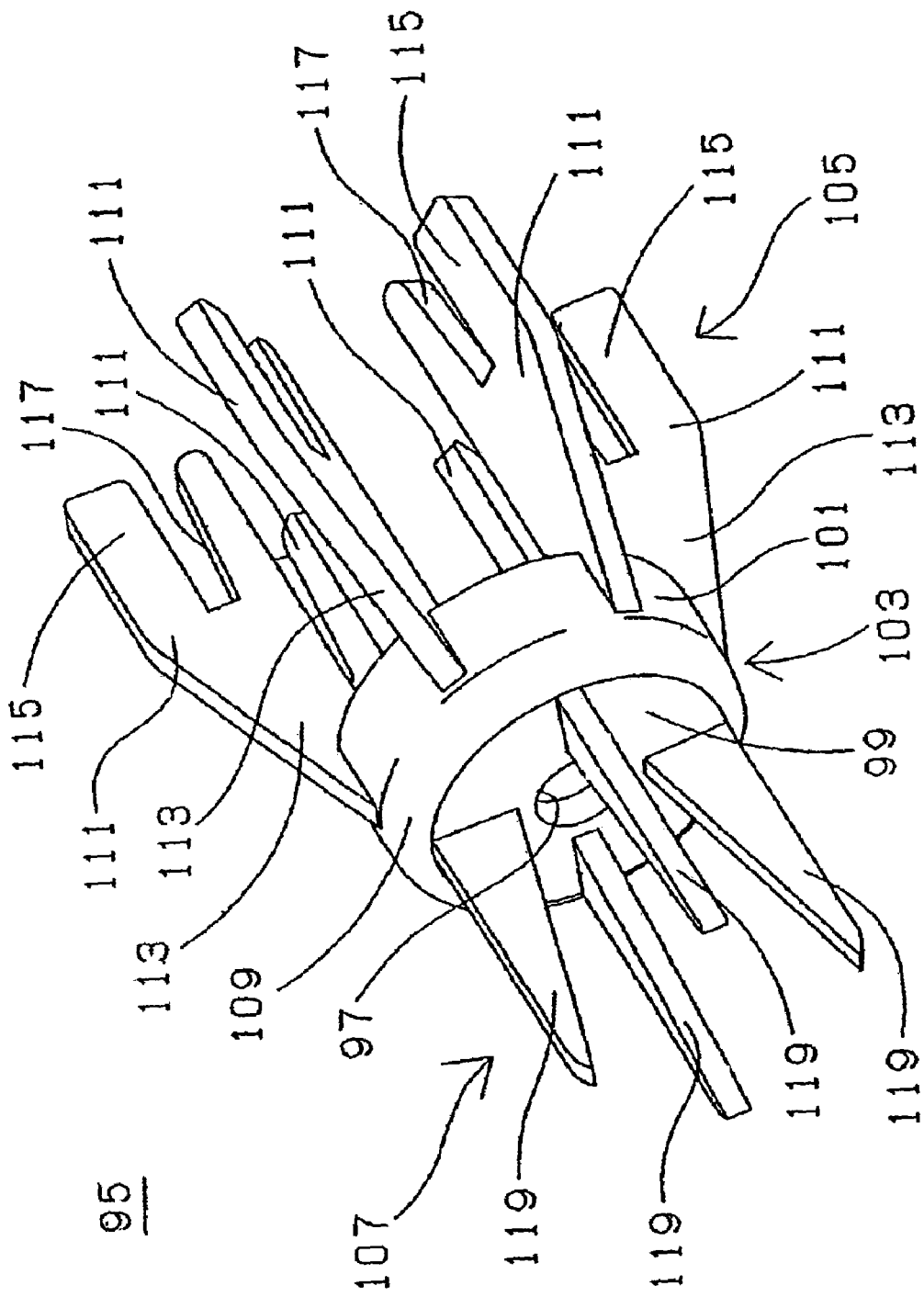
FIG. 5 is a perspective view of a main valve body of the present invention.

Referring to FIG. 5, a main valve body 95 of the internal check valve 7 is housed in the valve housing section 15. The main valve body 95 is integrally formed and includes a closing section 103 having a thin, disk-shaped section 99 formed with a small through-hole 97 at the center and a ring-shaped section 101 disposed at the outer perimeter of the thin, disc-shaped section 99 and extending a short distance toward the second axial end; and a housing-side guide 105 disposed on the ring-shaped section 101 of the closing section 103 and extending toward the second axial end; and a connection-side guide 107 extending from the outer perimeter of the disc-shaped section 99 of the closing section 103 toward the first axial end. The main valve body 95 is formed from POM. In the closing section 103, an outer perimeter surface or connection outer perimeter surface 109 is disposed at the site of the connection between the disc-shaped section 99 and the ring-shaped section 101. The connection outer perimeter surface 109 is formed as an arc that, in cross section, projects outward, and serves as an abutting surface that abuts the second ring-shaped surface of the housing inner perimeter surface 89 and is formed as a straight line in cross section.

The housing-side guide 105 is formed from six plate-shaped housing-side slide legs 111 which are disposed integrally with the ring-shaped section 101 and arranged uniformly along the perimeter. More specifically, housing side legs 111 can be disposed at 60° intervals. Each housing-side slide leg 111 includes a support section 113 disposed on the ring-shaped section 101 and a rectangular slide section 115 formed continuously and integrally with the second axial end of the support section 113. The thickness axis of the plates are oriented to be aligned with the tangent of the ring-shaped section. The radial distance from the center of the ring-shaped section 101 to the radially outermost surface of the slides 115 are roughly identical to the radius of the inner perimeter surface 77 of the valve housing section 15 or are slightly shorter than the radius of the inner perimeter surface 77 of the valve housing section 15. The radially outermost surfaces of the slides 115 are formed as surfaces extending in the axial direction and allow sliding motion over the inner perimeter surface 77 of the valve housing section 15. Support grooves 117 extend toward the first axial end and are formed on the second axial ends of the slide sections 115.

The support grooves 117 are disposed at radial positions roughly identical with that of the ring-shaped section 101.

The connection-side guide 107 is formed from four plate-shaped connection-side slide legs 119 disposed integrally with the outer perimeter of the disc-shaped section 99 and arranged uniformly along the perimeter. More specifically, connecting-side slide legs can be disposed at 90° intervals. For each connection-side slide leg 119, the thickness axis of the plate is oriented to be aligned with the tangent of the disc-shaped section 99, with the radially outermost end forming an axially extending right triangle shape. The radial distance from the center of the disc-shaped section 99 to the radially outermost ends of the connection-side slide legs 119 or the radial distance to the radially outermost ends are roughly identical to the radius of the inner perimeter surface 55 of the tube connection section 11 or are slightly shorter than the radius of the inner perimeter surface 55 of the tube connection section 11. The radially outermost surfaces of the connection-side slide legs 119 are formed so that they can slide over the inner perimeter surface 55 of the tube connection section 11.

Referring again to FIG. 4, a compression coil spring 121 has a first axial end housed in the support groove 117, which is formed on the slide section 115 of the housing-side slide leg 111, and a second axial end abutting the spring receiving section 85 of the valve cap 75. The compression coil spring 121 biases the second axial end of the main valve body 95 so that the connection-side guide 107 enters the through-path 3 of the tube connection section 11 and the connection outer perimeter surface 109 of the closing section 103 abuts an axial center position of the second ring-shaped surface 93. The cylindrical section 87 of the valve cap 75 acts to internally hold the second axial end of the compression coil spring 121.

Figure 6:
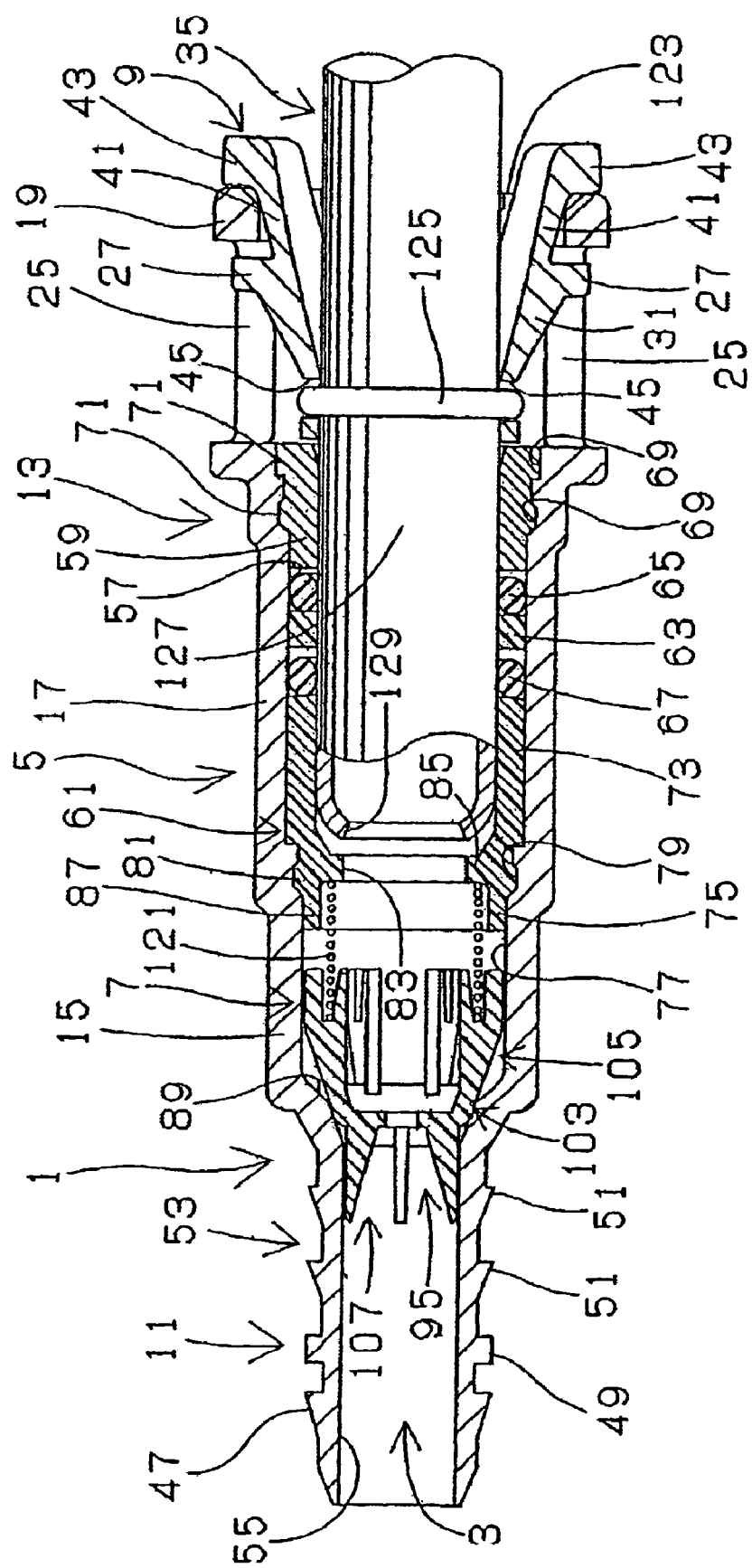
FIG. 6 is a cross-sectional view illustrating a pipe body connected to a connector equipped with a valve of the present invention.

Referring to FIG. 6, a pipe body 35 is inserted into the valve-equipped connector 1 from a second axial end opening or insertion opening 123 of the retainer support section 19. More specifically, the pipe body 35 can be made from a metal or resin material or the like and is inserted and fitted into the main body 31 of the retainer 9 from the side of the operating ends 43, 43 of the operating arms 41, 41. The pipe body 35 includes an insertion-side end 127 which is formed with a ring-shaped engagement projection 125 disposed on the outer perimeter surface toward the first axial end. When the pipe body 35 is inserted, the ring-shaped engagement projection 125 is moved forward, widening the main body 31 of the retainer 9 and is pushed into the valve-equipped connector 1 or the connector housing 5 until it snaps to and engages with the engagement slits 45, 45. When the pipe body 35 is inserted properly, the first axial end of the pipe body 35 is positioned in front of the valve cap 75, i.e. toward the second axial end. The snapping engagement of the ring-shaped engagement projection 125 of the pipe body 35 to the engagement slits 45, 45 of the main body 31 of the retainer 9 prevents slippage from and further insertion into the valve-equipped connector 1. Thus, the snapping engagement provides positioning along the axial direction. The insertion-side end 127 of the pipe body 35 is inserted into the ring-shaped bushing 59 and the cylindrical bushing 61 to provides a secure fit. The first O-ring 65 and the second O-ring 67 seal the connection between the pipe body 35 and the valve-equipped connector 1. The through-hole 83 of the valve cap 75 is formed with a diameter that is roughly the same as that of an outlet opening 129 of the pipe body 35 or slightly larger than that of the outlet opening 129.

When the operating ends 43, 43 of the operating arms 41, 41 are pressed from outside so that the radial distance between the operating arms 41, 41 is reduced, i.e., radial distance between the engagement claws 27, 27 is reduced, the engagement claws 27, 27 are disengaged from the engagement windows 25, 25, and the retainer 9 can be pulled from the connector housing 5, resulting in the pipe body 35 being pulled from the retainer 9 and the connector housing 5.

Figure 7:
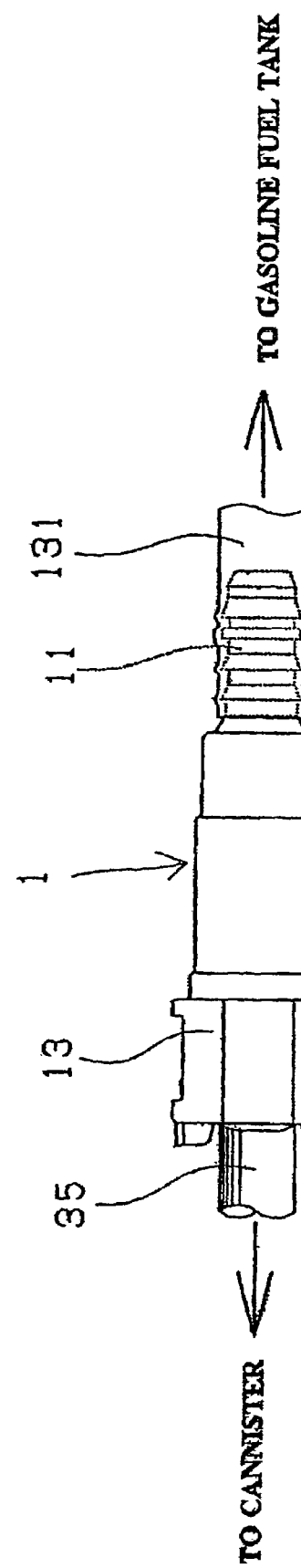
FIG. 7 illustrates the use of a connector equipped with a valve in evaporation tubing and cannister and gasoline fuel tank of the present invention.

FIG. 7 illustrates how the valve-equipped connector 1 is used in evaporation tubing.

A resin tube 131 is connected to a gasoline fuel tank (not illustrated) and is fitted to the outer perimeter of the tube connecting section 11 of the valve-equipped connector 1 (the right side of FIG. 7). The cannister-side pipe body 35 is inserted into the pipe insertion section 13 (the left side of FIG. 7).

Figure 8:
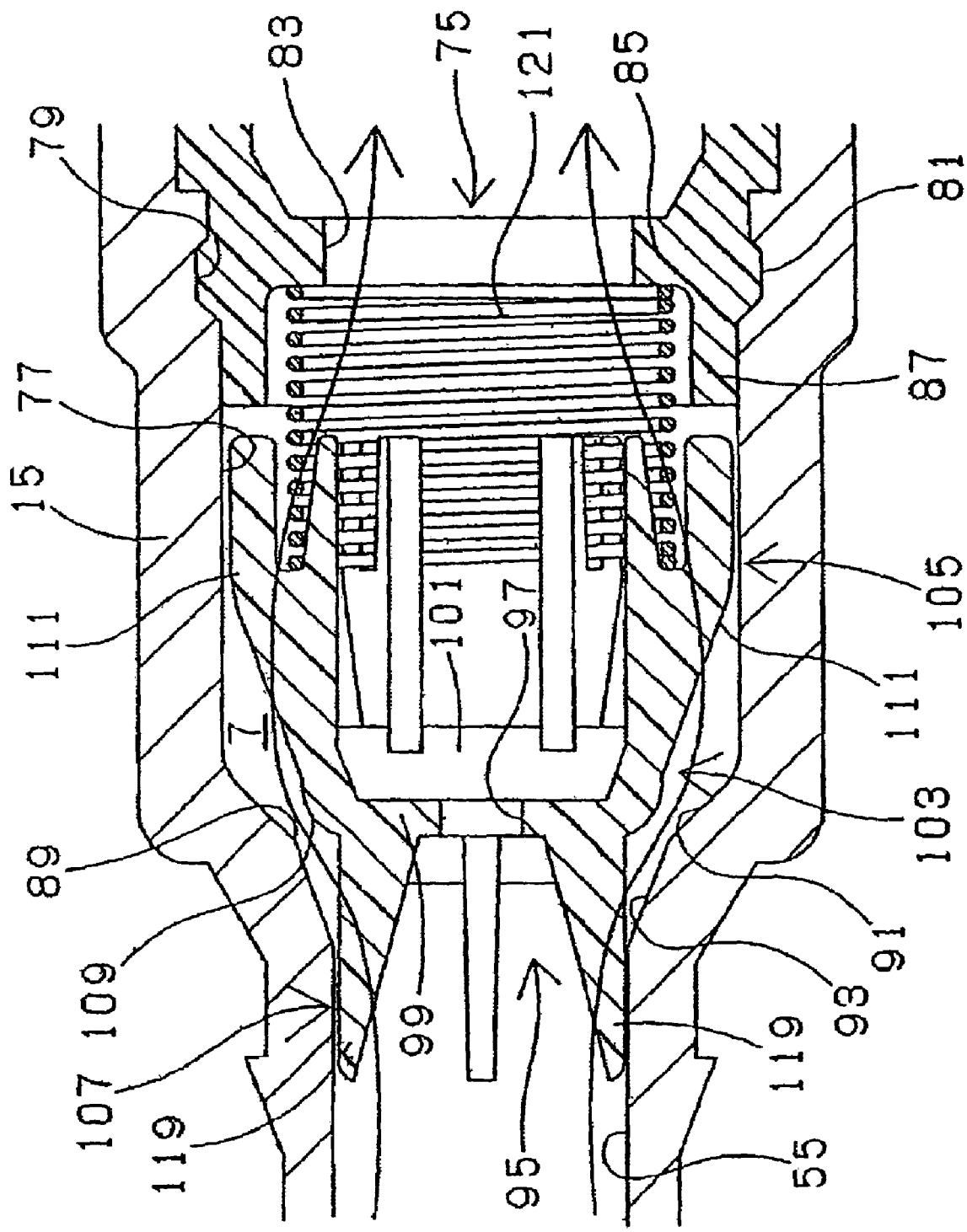
FIG. 8 is a cross-sectional view of the main valve body in an open state.

FIG. 8 illustrates that when the vapor pressure in the gasoline fuel tank rises, the main valve body 95 moves toward the second axial end in opposition to the compression coil spring 121. When the main valve body 95 moves toward the second axial end and the connection outer perimeter surface 109 of the closing section 103 moves away from the axial center position of the second ring-shaped surface 93, vapor passes through a large-diameter ring-shaped gap formed between the connection outer perimeter surface 109 of the closing section 103 and the axial center position of the second ring-shaped surface 93. The vapor flows into the valve holding section 15. The vapor then passes through the through-hole 83 of the valve cap 75, enters the pipe body 35 from the outlet opening 129, and is sent to the cannister. The main valve body 95 can move to the second axial end until the slide 115 of the housing-side slide leg 111 abuts the cylindrical section 87 of the valve cap 75. The axial movement of the valve cap 75 is accompanied by sliding motion on the inner perimeter surface 77 of the housing-side slide leg 111 and sliding motion on the inner perimeter surface 55 of the connection-side slide leg 119, thus preventing tilting of the main valve body 95 during motion. Also, since the connection-side slide leg 119 is longer than the axial distance of the cylindrical section 87 of the valve cap 75 and the housing-side slide leg 111 when the main valve body 95 is in the closed state and is longer than the axial movement distance of the main valve body 95, the connection-side slide leg 119 does not slip out from the tube connection section 11 due to movement of the main valve body 95.

In the valve-equipped connector 1 described above, the main valve body 95 does not move toward the second axial end unless the vapor pressure in the gasoline fuel tank reaches a predetermined value, i.e., until a minimum activation pressure for the main valve body 95 is reached. Thus, when the main valve body 95 forms a completely closed body, vapor cannot be sent to the cannister side if the pressure in the gasoline fuel tank is low. However, it is preferable to have vapor flow to the cannister even if the vapor pressure in the gasoline fuel tank is low so that the pressure in the gasoline fuel tank can be adjusted to an appropriate value. Thus, the small through-hole 97 is formed on the disc-shaped section 99 of the main valve body 95 so that vapor can flow even when pressure is low. The small through-hole 97 is formed with a diameter that is roughly one-third to one-fifth the diameter of the through-path 3 of the tube connection section 11 or the abutting site with the connection outer perimeter surface 109 of the second ring-shaped surface 93.

In the valve-equipped connector described above, the internal valve can be formed with a large diameter, thus allowing high flow volume to be provided easily. Also, valve functions can be provided without requiring high-precision dimensions for many parts. Furthermore, special care is not required in assembly, so the connector can be easily produced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A connector equipped with a valve, comprising:
a connector housing comprising:
a through path;
a tube connection section being formed at a first axial side;
a pipe insertion section being formed at a second axial side;
a valve housing section disposed between a pipe insertion section side end of said tube connection section and said pipe insertion section;
an inner diameter of said valve housing section being larger than an inner diameter of said tube connection section;
an internal valve disposed in said connector housing to open and close said through path and comprising:
a valve seat surface formed on an inner surface of said housing between said tube connection section and said valve housing section;
a main valve body housed in said valve housing section and allowing axial movement, the main valve body including a closing section having an outer perimeter section and an abutting surface formed on said outer perimeter section and abutting said valve seat surface;
a compression spring biasing said main valve body toward a first axial side;
a cylindrical bushing being fitted to said pipe insertion section and filling a space between an inner perimeter surface of a first axial side of said pipe insertion section and an insertion-side end of an inserted pipe body;
a housing-side guide extending from said closing section to a second axial side and sliding over an inner perimeter surface of said valve housing section; and
a connection-side guide extending toward a first axial side from said closing section and sliding over an inner perimeter surface of said tube connection section.

2. The connector equipped with a valve as described in claim 1, further comprising a valve cap receiving a second axial-side end of said compression spring and being integrally formed with a first axial-side end of said cylindrical bushing.

3. The connector equipped with a valve as described in claim 1,
further comprising;
a support groove formed on a second axial side of said housing-side guide of said main valve body wherein a first axial-side end of said compression spring is held and supported in said support groove.

4. The connector equipped with a valve as described in claim 1, further comprising a small through-hole communicating with said through-path at both axial sides of said closing section and formed in said closing section of said main valve body.

5. The connector equipped with a valve as described in claim 1, wherein said valve seat surface is formed with a linear cross-section shape and said abutting surface of said closing section is formed as an arc projecting outward in cross section.

* * * * *

UNITED STATES PATENT AND TRADEMARK OFFICE
CERTIFICATE OF CORRECTION

PATENT NO. : 7,222,637 B2
APPLICATION NO. : 10/666485
DATED : May 29, 2007
INVENTOR(S) : Atsuo Miyajima It is certified that error appears in the above-identified patent and that said Letters Patent is hereby corrected as shown below:

Title page add
(73) Assignees: Tokai Rubber Industries, Ltd. (JP)
 Honda Motor Co., Ltd. (JP)

Signed and Sealed this

Twenty-seventh Day of January, 2009

JOHN DOLL
*Acting Director of the United States Patent and Trademark Office*